April 19, 1960 T. J. SCUITTO 2,933,249
ACCUMULATOR
Filed Aug. 7, 1957 6 Sheets-Sheet 1

INVENTOR.
THOMAS J. SCUITTO
BY
ATTORNEYS

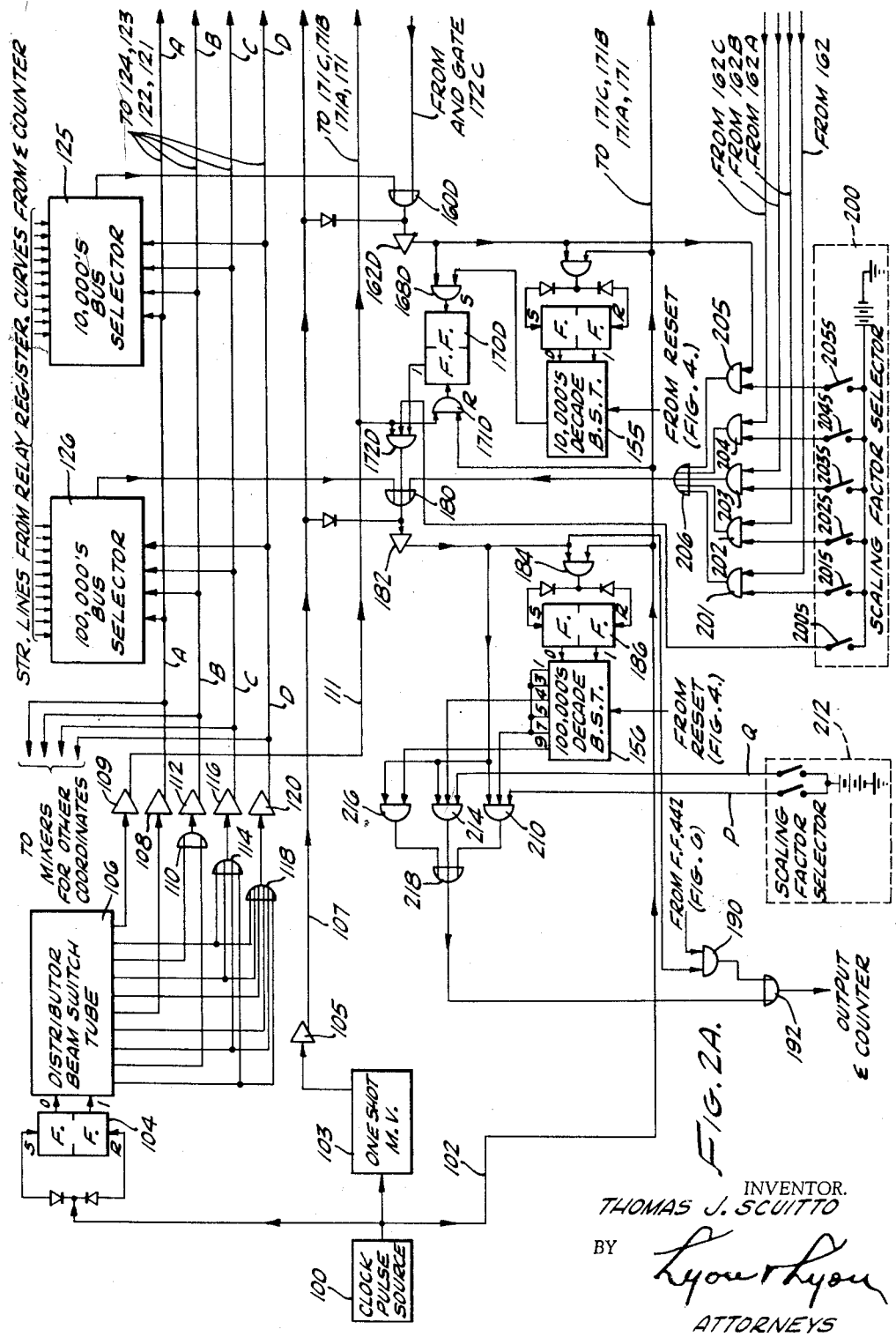

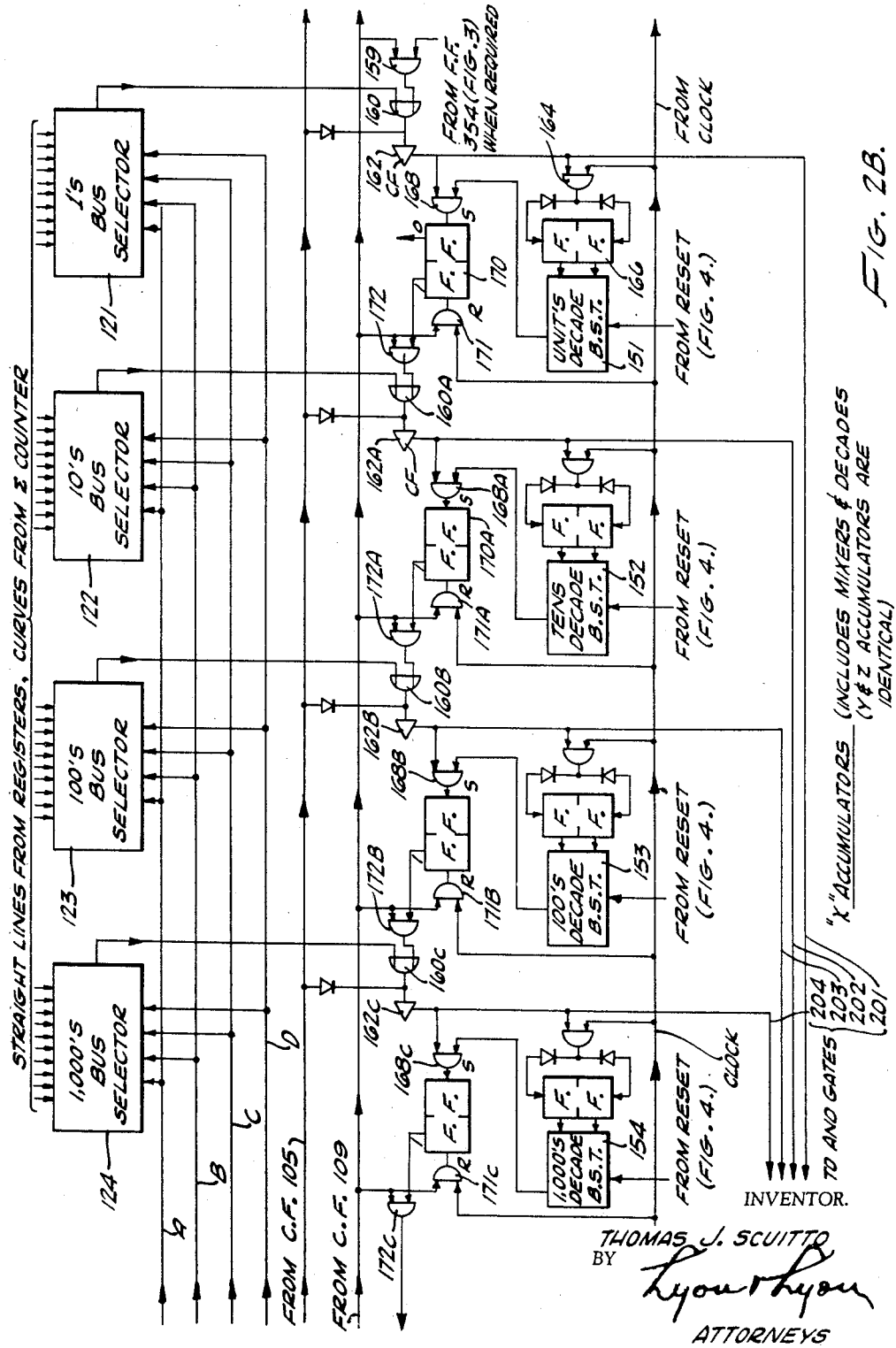

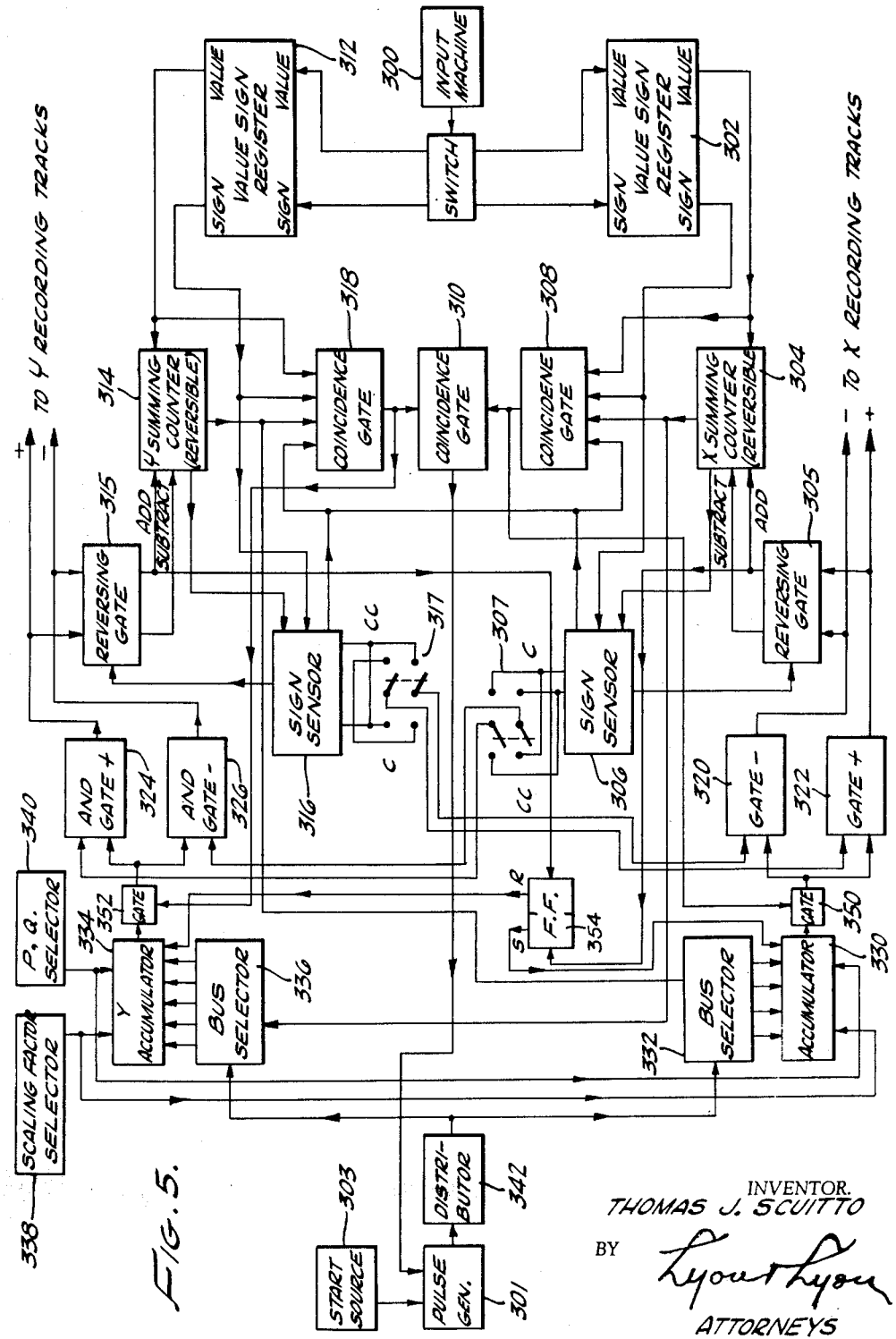

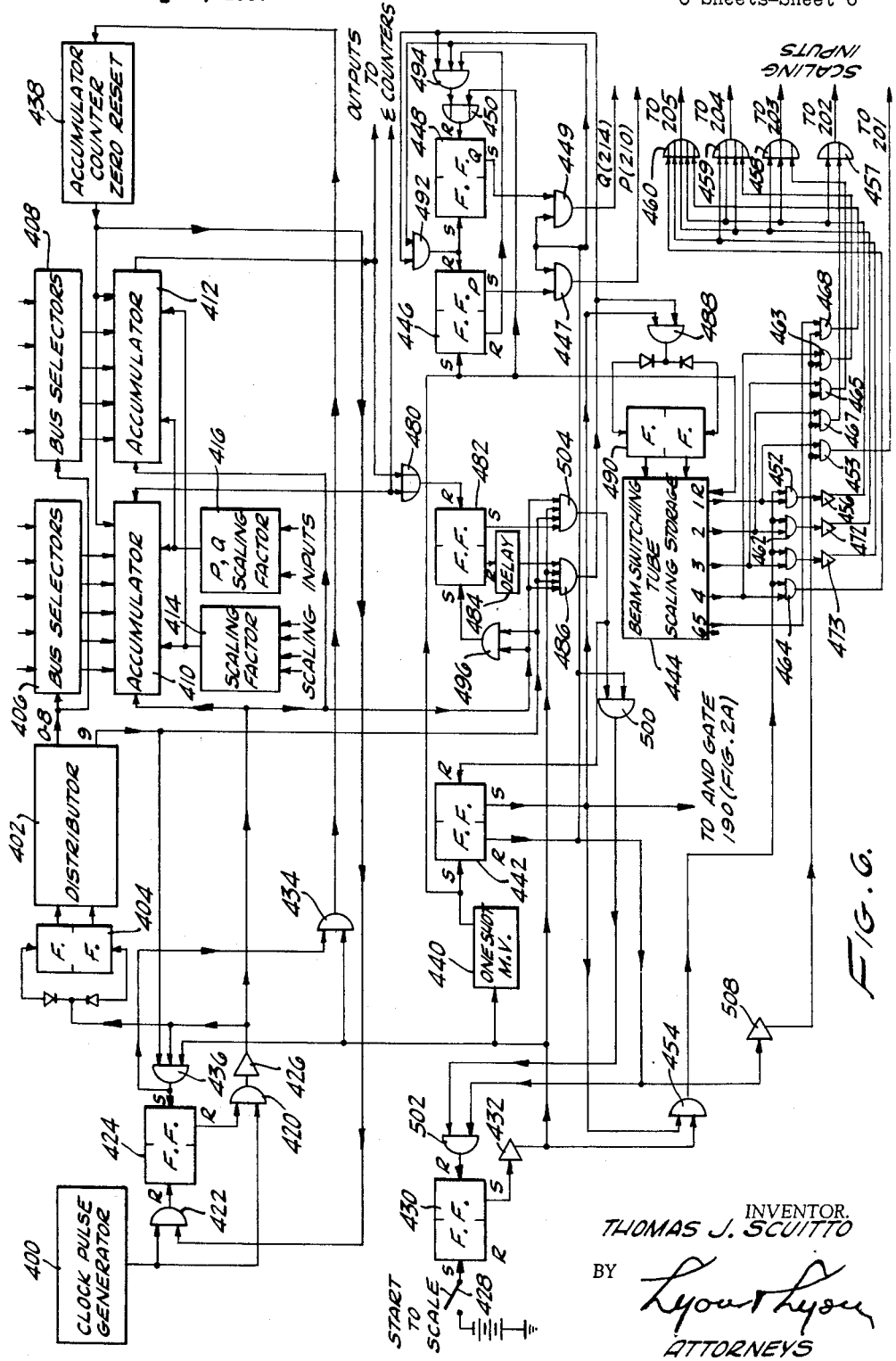

United States Patent Office 2,933,249
Patented Apr. 19, 1960

2,933,249

ACCUMULATOR

Thomas J. Scuitto, Santa Monica, Calif., assignor, by mesne assignments, to General Dynamics Corporation, Rochester, N.Y., a corporation of Delaware Application August 7, 1957, Serial No. 676,888

7 Claims. (Cl. 235—152)

This invention relates to apparatus for deriving a pulse train from a source of pulses having a frequency which is determined by instructions applied to said apparatus. More particularly, this invention relates to an improved arrangement whereby pulses for commanding motion increments along co-ordinate axes for effectuating a desired resultant path may be derived from a source of clock pulses.

In an application for an Automation System, filed November 2, 1955, by Jack Rosenberg, Alexander F. Brewer, and this inventor, Serial No. 544,478, now Patent No. 2,833,941, there is described and claimed an arrangement for generating pulse trains which can be employed for the purpose of commanding the motion of machine tools in a manner so that a desired operation may be accomplished. For example, it may be desired to move the table of a milling machine so that the cutting tool of the machine cuts a desired contour on a workpiece mounted on the table. Otherwise stated, a desired motion path may be ordered by means of these pulse trains which may be one of the contours on the workpiece as shown on a blueprint. The application describes apparatus for deriving pulse trains for ordering straight-line motion and also apparatus for deriving pulse trains for ordering motion in curved paths. In deriving these pulse trains for a two-co-ordinate system, it is shown that a source of periodic pulses, or clock pulses, is applied to two means, one of which by a process which may be termed division, divides the number of pulses obtained from the source by the differential of the equation of the desired motion path with respect to one co-ordinate of motion. The second means divides the pulses received from the source simultaneously by the differential of the equation of the desired motion path with respect to the other co-ordinate of motion. The output pulses from the two means may either be directly utilized, or preferably, are recorded for future utilization. The data for finding the differential for each path is obtained from the co-ordinates of the beginning and the ending of the path, if a straight line. If a circle, the co-ordinates of the center of the circle are also required. In each pulse train, each pulse represents an increment of motion along the co-ordinate axis. Each train of pulses contains as many pulses as there are increments of motion required along the co-ordinate, so that the resultant of directing motion simultaneously along the co-ordinates provides a resultant motion which is the desired path. For a machine tool such as a milling machine, the table is thus directed to move to provide a desired cutting path on a workpiece.

In the system described, counter circuits were employed for performing the required division. It was found, however, that although the system operates satisfactorily and performs in the manner described, time is required for the counter circuits to either count to a predetermined number or to be filled, if operated as a predetermined counter, to provide the required number of pulses. Thus, with a large number of pulses required, or with spacing between the pulses in order to adequately describe the motion along a co-ordinate, a considerable amount of time may elapse until that pulse train has been generated.

An object of the present invention is to provide circuitry for reducing the time required for deriving a pulse train of the type described from a clock-pulse source.

Another object of the present invention is the provision of novel and useful circuitry for varying the number of pulses derived from the number of pulses received from a clock-pulse source in accordance with desired control information.

Another object of the present invention is the provision of a system for enabling the selection of a proper scaling factor in accordance with the number of pulses required to be derived from a clock-pulse source.

Still another object of the present arrangement is circuitry which more rapidly achieves the same results as are obtained by division of the number of pulses from a clock-pulse source by accumulation and scaling.

Yet another object of the present invention is to provide a novel decimal adding and multiplying system.

These and other objects of the invention are achieved in an arrangement wherein instead of filling the remaining count capacity of a predetermined counter or counting up to a predetermined count in a counter before deriving an output pulse therefrom, circuitry is provided for entering a number into a counter each time a group of clock pulses occurs. The number is entered by selecting a number of pulses for each digit position of the number from each clock-pulse group. These selected pulses are entered into counter decades in corresponding digit positions. Provision is made for obtaining an output pulse from the counter each time the value being accumulated in the counter equals or exceeds an integral of a preset number, which may be termed the scaling factor required. Output from the counter or accumulator will then provide the required pulses for the control-pulse train.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

Figures 2A and 2B are block diagrams of an embodiment of the invention;

Figure 5 is a block diagram of a circle control-pulse generator modified in accordance with this invention; and Figure 6 is a block diagram of apparatus for automatically finding a correct scale factor for the embodiment of the invention.

Figure 1:
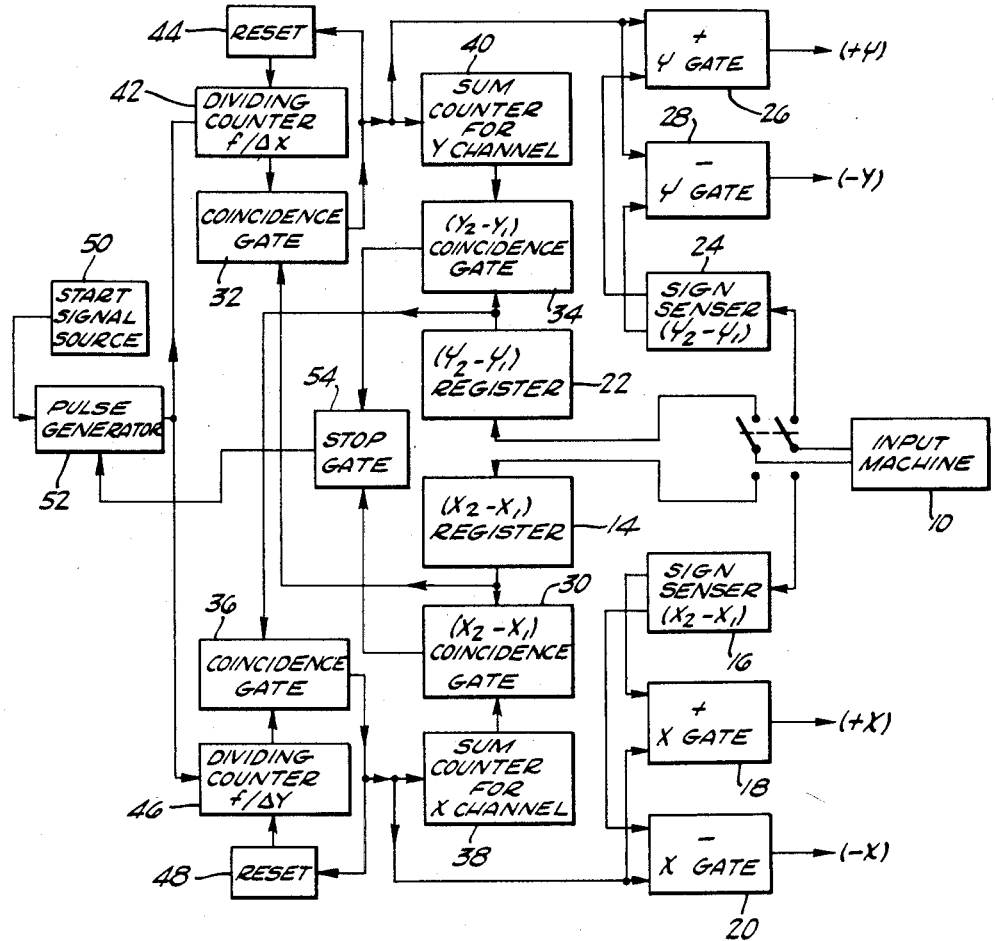
Figure 1 is a block diagram of a straight-line control-pulse generator shown to assist in an understanding of the invention.

From elementary algebra, it can be established that the formula of a straight line is $y=mx+b$. The slope of a straight line can be obtained by differentiating $y$ with respect to $x$, whereby $$\frac{dy}{dx}=m$$

is obtained; $m$ is the value of the slope which for any given straight line is a constant. Now let us consider a rectangular co-ordinate system having the co-ordinates $x$ and $y$, wherein a line having the slope $m$ extends between two points, one of which is $x_1$, $y_1$, and the other of which is $x_2$, $y_2$. It can readily be shown that $$m = \frac{y_2 - y_1}{x_2 - x_1}$$

which is equal to $$\frac{\Delta y}{\Delta x}$$

Therefore, $\Delta y = y_2 - y_1$ and $\Delta x = x_2 - x_1$. From this it can be concluded that to go from one end of a straight line to the other end of the straight line along the straight line, a simultaneous motion along the $x$ and $y$ axis in the relationship $$\frac{\Delta y}{\Delta x}$$

will provide a resultant motion following the desired path. It should be noted that $x_2 - x_1$ is the projection of the straight line on the $x$ axis and $y_2 - y_1$ is the projection of the straight line on the $y$ axis.

In the previously referred to application by Rosenberg et al., there is shown how to obtain a control-pulse train for each axis of a co-ordinate system, which may be employed to direct motion along each axis to obtain a resultant motion which is the desired path. If, for example, a milling machine is to be controlled to provide a desired cut on a workpiece if the co-ordinates of the beginning and ending of the cutting path are known, the table of the machine may be directed simultaneously to move distances along the respective two co-ordinate axes as expressed by the differences $(x_2 - x_1)$ and $(y_2 - y_1)$ to effectuate the desired resultant cutting path. Such control of the table motion may be made by simultaneously driving the lead screws for each co-ordinate in response to a train of pulses. In response to a pulse, an increment of table motion is made to occur which may be on the order, for example, of 0.001 inch. Accordingly, a pulse train will have as many pulses as there are required increments of motion. Thus, if a straight-line cut of 10" long, for example, the $x$-axis is required, then 10,000 pulses would be required in the pulse train. Similarly, if a straight-line cut of 5" along the $y$-axis is required, then 5,000 pulses are required in the $y$-axis pulse train. It should be appreciated that in order to make a desired straight-line cut having a desired slope, both co-ordinate motion screws are simultaneously driven from the separate pulse trains. In the illustration employed, with a simultaneous motion of 5" along the $y$-axis and 10" along the $x$-axis, a straight line having a slope of 0.5 would be provided.

It is shown in the previously referred to application by Rosenberg et al. that in a blueprint a required cut may be referenced to two base lines which are relatively rectangularly disposed. These serve as co-ordinate axes from which $x_2 - x_1$ and $y_2 - y_1$ may be readily determined. It is known that the output of a pulse generator may be readily divided by a counter. Thus, if pulses from a pulse generator are applied to two counters, from each of the counters there may be derived the train of pulses which equals the input divided by the count of the counter. Expressed another way, the pulse rate $f$ of the the generator is divided by the scale of the counter. If one counter is set to divide its input $f$ by $\Delta y$ and the other counter is set to divide its input $f$ by $\Delta x$, there will emerge from the $\Delta x$ counter a train of uniformly spaced pulses at one rate $$\frac{f}{\Delta x}$$

while from the $\Delta y$ counter will emerge a train of uniformly spaced pulses at another rate $$\frac{f}{\Delta y}$$

The ratio between the two rates is $$\frac{\frac{f}{\Delta x}}{\frac{f}{\Delta y}} = \frac{\Delta y}{\Delta x} = \frac{y_2 - y_1}{x_2 - x_1}$$

This is exactly the slope of the desired cut between points $x_1$, $y_1$ and $x_2$, $y_2$.

The two output-pulse trains derived from the respective dividing counters may be recorded on two separate tracks on magnetic tape. These two tracks are simultaneously read and the outputs derived are applied to the motors controlling the lead screws driving the milling-machine table. Thus, as far as the pulse trains are concerned, two things are important. First, the correct number of pulses must be derived to move the correct distance. Second, for proper slope control, since $x$ and $y$ motions are made to occur together, the relative occurrence of the pulses is important.

It should be appreciated that the frequency of the clock-pulse generator has no effect on the slope and, as seen from the mathematics, cancels out in the final equation. The frequency of the clock-pulse source, however, is of concern in establishing the time required to generate the pulse trains. Thus, in the above example, it is the time required to generate a pulse train having 10,000 pulses that fixes the minimum time which can be allowed for generating control pulses. This means that if the clock-pulse generator operates at a frequency of 500,000 cycles per second, one counter (the $\Delta x$ counter) is set to count 10,000 and provides an output for every 10,000 pulses counted. The $\Delta y$ counter is set to count 5,000 and provides an output for every 5,000 pulses counted. The output of the $\Delta y$ counter establishes the pulse train for directing motion along the $x$ co-ordinate axis and the output of the $\Delta x$ counter establishes a pulse train for controlling motion along the $y$ co-ordinate axis. The $\Delta x$ counter will provide an output pulse every $\frac{1}{50}$ of a second, and, since 10,000 of these are required, it will require three and one-third minutes of operating time for completion. It can thus be seen that where a long series of different paths must be performed, the time of operation of the system is not as rapid as is desired. Increasing the clock frequency to provide a more rapid operation of the system is not too effective a method, since the amount of correction which can be obtained is limited by the speed of counters, gates, and other associated apparatus required.

Figure 1 is a block diagram of a straight-line control-pulse generator, which is shown to assist in an understanding of this invention. This straight-line control-pulse generator is described and claimed in the previously noted application to Rosenberg et al. As pointed out previously, information required for generating the co-ordinate ($x$ and $y$) pulse trains which may be employed for machine-tool control is derived from the blueprints containing the desired path which may be the edge of the particular piece which is to be cut, or may be the line between the centers of holes which are to be drilled. In any event, this path has a beginning and an ending. The beginning of the path is identified by co-ordinates $x_1$, $y_1$ and the end of the path is designated by co-ordinates $x_2$, $y_2$. The slope of a straight line may be negative, as well as positive. This may readily be determined by the sign of the remainder when $x_1$ is subtracted from $x_2$. To calculate $x_2 - x_1$ and $y_2 - y_1$, a machine such as an adding machine may be employed. This is designated in Figure 1 as an input machine 10. First, for example, $x_2 - x_1$ is calculated, and the switch 12 is connected to enter this amount into the $x_2 - x_1$ register 14. Whether the sign of this difference is positive or negative is entered into the sign senser 16. If positive, sign senser 16 will open plus-$x$ gate 18. If negative, the sign senser 16 will enable, or open, a minus-$x$ gate 20.

The switch 12 is then thrown to connect the input machine to the $y_2-y_1$ register 22 and also to the sign senser for $y_2-y_1$ 24. The difference $y_2-y_1$ is entered into the register 22 and its sign into the sign senser 24. Thus, either the plus-y gate 26 or the minus-y gate 28 will be enabled in response to the sign of the difference $y_2-y_1$. The number which is entered into the $x_2-x_1$ register 14 is also established in a first $x_2-x_1$ coincidence gate 30 and into a second coincidence gate 32. The number in the $y_2-y_1$ register 22 is also entered into a first $y_2-y_1$ coincidence gate 34 and a second coincidence gate 36. The coincidence gate 30 monitors the count in the sum counter for the $x$ channel 38 and provides an output as soon as the sum counter 38 reaches the count equal to $x_2-x_1$ in the coincidence gate 30. Similarly, the $y_2-y_1$ coincidence gate 34 monitors the count in the sum counter for the $y$ channel 40. It provides an output when the count in the sum counter 40 equals the number $y_2-y_1$.

The second coincidence gate 32 monitors the count in a dividing counter 42, designated as the $$\frac{f}{\Delta x}$$

dividing counter. When this dividing counter has counted to the number in the $x_2-x_1$ register, the coincidence gate senses this and emits an output which is applied to a reset circuit 44, which resets the dividing counter 42. The coincidence gate 32 output is also applied to the sum counter 40 to increase its count by one and is also applied to the plus-y and minus-y gates. Coincidence gate 36 monitors the count in the divide counter 46, designated as the $$\frac{f}{\Delta y}$$

divide counter. When the count in the divide counter 46 equals the number $y_2-y_1$, the coincidence gate 36 emits a pulse which is applied to the reset circuit 48 to reset the divide counter to zero. This reset pulse is also applied to the sum counter 38 to increase its count by one and also to the plus- and minus-$x$ gates 18 and 20.

The operation of this system is as follows: After the values of $x_2-x_1$ and $y_2-y_1$ have been entered into the respective register 14 and 22 and their respective signs have been entered into the sign sensers 16 and 24, a start-signal source 50, which may consist of an energizing switch, applies a start signal to a pulse generator 52, which operates at a frequency "$f$." Pulse generator 52 is alternatively identified herein as the clock-pulse source. Its output is applied simultaneously to the two divide counters 42, 46. The counters increase their count by one for every clock pulse entered therein. Suppose, for example, that the number in the $x_2-x_1$ register is 10,000; then when the counter 42 attains the count of 10,000, the coincidence gate 32 provides an output pulse which resets the divide counter 42 to zero, which output pulse increases the count of the sum counter 40 by one. If the sign of $y_2-y_1$ (as stored in sign senser 24) is positive, then the plus-y gate is enabled and it will apply its output pulse to subsequent recording or control apparatus, as desired. Suppose, further, that the number $y_2-y_1$ is 5,000; then when the sum counter 40 finally counts 5,000 pulses, the coincidence gate 34 will sense this fact and apply its output to the stop gate 54. With the number in the $y_2-y_1$ register equal to 5,000, then when counter 46 attains a count of 5,000, coincidence gate 36 will provide the pulse which enables the reset circuit 48 to reset counter 46 and which adds one to the count in the sum counter 38 and which will be emitted by either the plus-$x$ or minus-$x$ gate in accordance with the sign of the $x_2-x_1$ number.

When the sum counter 38 counts 10,000, the coincidence gate 30 senses this condition and will apply its output to the stop gate 54. Since the output of the $y_2-y_1$ coincidence gate 34 also occurs at this time, the stop gate 54 is enabled to apply a pulse to the pulse generator to stop it from emitting further pulses to the divide counters. For the next path, the input machine 10 is again employed to enter the next set of differences and their signs, and the system is again energized to generate the two trains of control pulses, as required.

In the embodiment of the invention to be described, it is proposed to replace both divide counters 42, 46, both coincidence gates 32, 36, and both reset circuits 44, 48 by the inventive structure to be described. This enables the generation of the requisite control-pulse trains in a much shorter interval of time than possible with the equipment described.

Reference is now made to Figures 2A and 2B, which contain a block diagram of the structure in accordance with this invention, which may be employed as above described. In the system which is to be described, there are employed a number of tubes, known as magnetron-beam-switching tubes. These are manufactured and sold commercially by the Haydu Brothers of Plainfield, New Jersey, which company is a subsidiary of the Burroughs Corporation. Each beam-switching tube constitutes a decade counter. The beam-switching tube has ten outputs or targets, which may be successively energized by applying pulses successively to the ten switching grids. To advance the energization from one target to an adjacent target, a pulse is applied to the switching grid associated with that adjacent target. To avoid the complexity of external connections for each switching grid, alternate ones are connected to two bus bars. Switching pulses are applied to first one and then the other of these busses by means of alternate pulse-applying circuitry, such as the well-known flip-flop circuit which has two stable states and can be driven from one to the other of these stable states by successive application thereto of pulses. A suitable arrangement is shown and described in detail in a copending application by this inventor, entitled Electronic Counter, filed August 22, 1956, Serial No. 605,564. It will thus be seen that each one of these beam-switching tubes can act as a decade counter and provide successive outputs in response to the application thereto of successive pulses.

Referring now to Figures 2A and 2B, there will be seen the block diagram of this invention, including a clock-pulse generator 100, which applies its output to a distribution bus 102, to a one-shot multivibrator 103, and to a flip-flop circuit 104. The flip-flop circuit is connected by means of the diodes to be successively driven in response to the clock-pulse generator 100. The two outputs of the flip-flop 104 are applied to the two grid bus connections of the beam-switching tube 106, which may be designated as a distribution beam-switch tube. Nine of the ten outputs of the distributor beam-switching tube are collected by means of logic to be described, and are applied to four distribution busses, respectively designated as busses A, B, C, and D.

Bus A is connected to the fourth output target of the distributor beam-switch tube through a cathode follower 108. Thus, bus A will be energized by a single pulse each time the distributor achieves the count of four. Bus B receives two output pulses, upon the beam-switch tube attaining the counts of one and seven, respectively. These two outputs are connected to an OR gate 110, the output of which is connected to bus B through a cathode follower 112. Bus C is energized four times. The 0, 2, 6, and 8 outputs of the beam-switch tube are connected to an OR gate 114, the output of which is applied through a cathode follower 116 to bus C. Bus D is energized six times, in response to the 0, 2, 3, 5, 6, and 8 outputs of the distributor beam-switch tube. These are applied to OR gate 118, the output of which is connected to bus D through a cathode follower 120. The OR gate and cathode-follower logic described may be alternately considered as a premixer which distributes the output of the distributor beam-switch tube to four bus lines. These same four bus lines are employed for all the co-ordinate axes along which motion is to be controlled.

Each one of the busses is separately connected to each one of six circuits, separately represented by rectangles labeled "bus selector" 121–126. The function of each bus selector is to select one or more of the busses in accordance with the input information and provide an output consisting of the pulses from the selected busses. The input information for bus selector 121 will consist of, in the case of the straight-line computer shown in Figure 1, the number in the units digit place in register 14 (if this arrangement were employed to replace the dividing counter 46 and its associated structure) or the units number in register 22, if this structure were employed to replace divide counter 42 and its associated structure. Bus selector 122 would receive as input information the number in the tens-digit place in one of the previously mentioned registers; bus selector 123 would receive as input information the number in the hundreds-digit position; and, respectively, bus selectors 124, 125, and 126 would receive as input information the numbers in the thousands, tens of thousands, and hundred thousands digit positions in the respective registers. Thus, if the number in the register with which this apparatus is associated were 560,322, the input information to the respective bus selectors 126 through 121 would respectively be 5–6–0–3–2–2. The number of output pulses of the respective bus selectors would be for each group of ten pulse inputs to the beam-switch tube distributor 106, 5–6–0–3–2–2 pulses.

Figure 3:
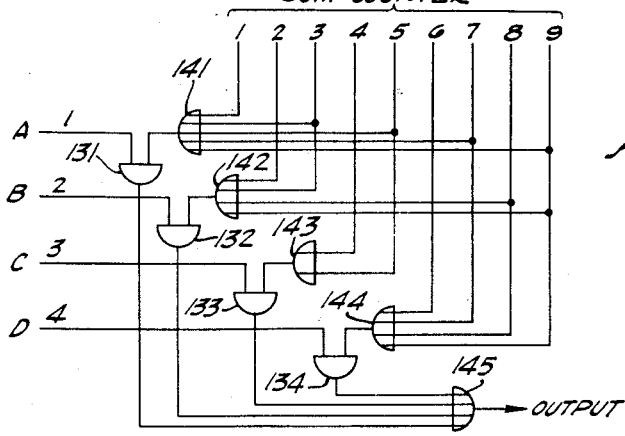
Figure 3 is a circuit diagram of a bus-selector circuit employed in the embodiment of the invention.

In order to more clearly understand the operation of the bus selector, reference is now made to Figure 3, which shows a block diagram of the required circuitry thereof. Each bus selector shown in the drawings includes the circuitry shown in Figure 3. The four busses which are the outputs A, B, C, D of the premixer arrangement, are respectively applied as one input to four AND gates 131, 132, 133, and 134. The other inputs to the respective AND gates which are required before the AND gates are enabled to pass the pulses from the respective busses consist of the outputs from four OR gates 141, 142, 143, and 144. OR gate 141 is energized to provide an output when the number in the digit position in the register with which it is associated is either 1, 3, 5, 7, or 9. OR gate 142 is energized to provide an output when the number in the digit position with which it is associated is 2, 3, 8, or 9. OR gate 143 provides an output when the number in the associated digit position is 4 or 5. OR gate 144 provides an output when the number in the digit position with which it is associated is 6, 7, 8, or 9. The outputs of all the AND gates 131 through 134 are collected by an OR gate 145, the output of which is the output of the bus selector.

Thus, assuming, for example, that the register which instructs the bus selectors consists of beam-switching tubes with one beam-switching tube representing the units-digit position and the second beam-switching tube representing the tens-digit position, etc., a value entered into a beam-switching tube energizes one of the ten output targets. If this output were the five target, then OR gates 141 and 143 provide an output to enable AND gates 131 and 133 to pass pulses received when the respective A and C busses are energized. By referring back to the previous description, it will be seen that bus A is energized once upon the count of 4, and bus C is energized four times on the 0, 2, 6, and 8 counts. Thus, the output of OR gate 145 will consist of five pulses occurring within the ten pulse count of the distributor beam-switch tube.

It should thus become apparent how, if the respective decades of the registers have their outputs representative of the contents of the register applied to the circuitry of the bus selector, an output will be obtained from each one of the bus selectors which is, for each group of ten pulses from the clock-pulse source, a number of pulses corresponding to the number in the digit position of the register with which the bus selector is associated. No output is obtained from the bus selector when the number in the digit position is zero. The output of each bus selector is obtained within the time of occurrence of ten pulses counted by the beam-switching tube distributor. As will be shown in the subsequent description herein, the outputs from the various bus selectors are entered into beam-switching tubes serving as a counter.

The counter into which the outputs of the various bus selectors are entered includes six beam-switching tubes 151, 152, 153, 154, 155, and 156. The last tube 156 is alternatively referred to as a collector decade 156. Decades 151 through 156 are each respectively associated with digit positions from units through 100-thousands digit positions. Thus, a parallel entry of the bus selector outputs into the counter decades enters the number which was used to instruct the bus selectors.

In order to effectuate such parallel entry, the output of bus selector 121 is applied to an OR gate 160, the output of which is applied through a cathode follower 162. The output of the cathode follower 162 is applied to an AND gate 164, which is enabled whenever a clock pulse is applied to the distributing bus 102, to which its other input is coupled. The output of the AND gate is applied to a driving flip-flop 166, which is driven from one to the other of its successive stable conditions in response to the output of the AND gate. Flip-flop 166 output advances the count in decade 151 in accordance with the number of pulses applied to the flip-flop. It should thus be apparent how, for example, two output pulses received from bus selector 121 enter a count of 2 into the units stage 151. The structure coupling the output of the remaining bus selectors 122 through 125 to their associated beam-tube decade stages 152 through 155 is identical and, accordingly, need not be described.

The one-shot multivibrator 103, when excited by the application thereto of a clock pulse, applies an output through a cathode follower 105 to a bus 107. The bus is coupled through individual diodes to the inputs to the cathode followers 162. The purpose of this structure is so that the cathode follower 162 output cannot occur until the one-shot multivibrator output is added to the bus selector output. In this manner, the driving pulse to the flip-flops is made sharp and is made to occur at the optimum time within the duration of the bus-selector output pulse.

The output of the cathode-follower 162 is also applied to an AND gate 168. The other input to this AND gate is the output of the decade counting stage when it reaches the count of 9. As soon as the next pulse from the bus selector appears at cathode follower 162, the AND gate output is enabled and sets a flip-flop 170. Flip-flop 170, when set, applies an output to an AND gate 172. This AND gate output is applied to the OR gate of the succeeding decade stage, here designated as 160A, to show its correspondence in function with that of the OR gate 160. The structure just described is employed for applying a carryover pulse from a lower-order decade stage to the next higher-order decade stage upon the occurrence of the tenth input to the lower-order decade stage. All carries occur during the ninth distributor pulse, a time when no bus selector pulses can be present. The flip-flop is necessary to store the fact that there was a carry and hold it till the ninth distributor pulse. At this time, the flip-flop 170 is set and decade 151 will be returned to its zero count condition.

Upon receiving the carryover pulse, the succeeding cathode follower 162A advances the count of the succeeding decade 152 in the same manner as it would enter a pulse received from the bus selector. The carry flip-flops 170, 170A, 170D are all reset upon the simultaneous occurrence of a clock pulse and the nine count from the distributor beam-switching tube 106. The clock pulse is applied as one input to AND gates 171 through 171D. The nine count of the distributor beam-switching tube 106 is applied to a cathode follower 109, the output of which is applied through a distributor bus 111 to carry gates 159 and 172A through 172D, and to the respective AND gates 171 through 171D. The output from these AND gates can then reset the carryover flip-flops.

The output of the bus selector 126 is entered into the collector decade through similar apparatus as has been described for the other counter decades. This includes an OR gate 180, the output of which is applied to an AND gate 184. AND gate 184 output drives a flip-flop 186, the output from which in turn drives the decade 156. The carryover flip-flop 170D, which receives the carryover output of decade 155, applies its set output to the AND gate 172D, which, when enabled by bus 111 and input from a switch 200S, applies its output to OR gate 180.

From what has been described thus far, it may be seen that the number in the input register of the system enables the bus selectors to select for the respective digit positions of the number a corresponding number of pulses within each ten-pulse output of the clock-pulse generator. This corresponding number of pulses for each digit position is then inserted into a counter so that that counter will contain a count equivalent to the original number in the register. Effectively thereafter, each time 10 pulses are applied to the distributor from the clock-pulse generator, the number is entered into the counter to be added to the total previously entered. Thus, effectively, the accumulator system shown performs a parallel adding function with provision made for carryover in the event any one of the decade stages becomes filled. Besides having independent use as a parallel adding system, the apparatus can also be used as a multiplier, since multiplication can be effectuated in terms of the repetitive parallel addition of a multiplicand by as many times as is required by the multiplier. Thus, effectively, the multiplicand can be entered into the counters by means of the selection afforded by the input to the bus selectors and the multiplier can effectively enable the clock-pulse generator to produce a number of clock pulses equal to 10 times the multiplier. The number then accumulated in the counter will be the product.

For the purposes of this invention, it is necessary to generate a train of pulses equal in number to the quantity in the register and bearing the proper time relationship to the pulses in a second pulse train simultaneously being generated by similar apparatus for the purpose of controlling motion along a second co-ordinate. This may effectively be done by providing an output pulse to the sum counter and to the x and y gates each time the sum in the counter, including the beam-switching tubes 151 through 156, exceed a preselected number. The preselected number must be the same for both pulse-train generating circuits in order to maintain the correct time relationships between the pulses within the respective pulse trains. The number selected is one which is based upon the larger of the numbers in the registers of the system shown in Figure 1.

In order to obtain the control-pulse trains with the highest possible speed, the selected number is one into which the highest number in the registers will go at least once, but not more than ten times. Such number may be selected manually or automatically. This operation is performed by the structure to be described. This includes a scaling-factor selector 200, which permits the individual energization of the enabling inputs to any one of the AND gates 201 through 205. The scaling-factor selecting apparatus in the scaling-factor selector 200 can comprise six switches 200S–205S. Any one of switches 201S–205S can be actuated to apply an enabling bias to one of the AND gates 201 through 205. It will be seen that the other input to each one of the AND gates 201 through 205 which provides the output is the same input as is being applied to the respective beam-switching tube decades 151 through 155. All of these AND gate outputs are applied to an OR gate 206, the output of which is a third input to OR gate 180, which, it will be recalled, is the input OR gate to the decade beam-switching tube 156.

The operation of the scaling-factor selector, as previously pointed out, merely consists of energizing a desired one of the AND gates 201 through 205 and switch 200S. These AND gates respectively will apply a pulse to the OR gate 206 for integral multiples of the numbers 1, 10, 100, 1000, and 10,000. Thus, assuming the scaling-factor selector selected AND gate 203 to be enabled, each time the number entered into the counter exceeded 99, a pulse would be applied to the decade 156. The number selected initially, by way of example, namely 560,332, would not require the energization of any one of the scaling factor AND gates, since each time the number is entered into the counters, the output of the bus selector 126 is also entered into the accumulator decade stage 156. Switch 200S is usually open for all numbers below 100,000, to restrict entries into the collector decade to scaling factor selections only, which would not occur were carries from decade 155 also entered. Switch 200S is closed, however, for numbers containing six significant figures enabling the carry output to be entered from AND gate 172D.

The use of the scaling factor may either be considered as a form of multiplication by a number greater than one, or as a division of the number in the counter by the scaling-factor value. As an example of the operation of the arrangement described thus far, should the number actuating the bus selectors have been, say 756, and should AND gate 203 have been selected, seven pulses would have been applied to the OR gate 206 during the application of the first 10 input pulses to the distributor beam-switching tube; thereafter, seven pulses would be applied during each ten clock pulses, and one extra pulse would be applied each time there was a carryover between decade beam-switching tubes 152 and 153. Alternatively stated, each time the sum increases an additional hundred, a pulse will be applied to the decade 156.

For any number to be used to control the bus selectors which has a value up to 9, it is desirable to select the first AND gate 201 by the scaling-factor selector. For numbers between 10 and 99, it is desirable to select the second scaling-factor AND gate 202. For numbers from 100 to 999, it is desirable to select the third scaling-factor AND gate 203. It should thus become apparent how, with increases in size of the numbers, the proper scaling factor may be selected.

Attention is now directed to the decade 156 output. It will be seen that the outputs designated as 1, 3, 5, and 7 are all connected together and, in turn, are connected to an AND gate 210. A second input to this AND gate is the output of cathode follower 182, which is the same as the input to the decade 156. A third input, which is required to be applied to the AND gate 210 before it provides an output, is an input designated as the output p of the pq scaling selector 212. The q output of the pq scaling selector is applied to an AND gate 214, which is also connected to the output of cathode follower 182 and receives as its third required input the fourth count output of the decade 156. A third AND gate 216 may be considered as a carryover AND gate, since it provides an output when the decade 156 leaves its nine count. The outputs of AND gates 210, 214, and 216 are collected by an OR gate 218, the output of which is applied to the sum counter and gates controlling the recording channels. With the arrangement shown, an output is obtained from the AND gate 210 upon the occurrence of the second, fourth, sixth, and eighth pulses to decade 156. Output is derived from AND gate 214 upon the application of the fifth pulse to be counted, and the AND gate 216 is received upon the application of the tenth output to decade 156.

If neither of the AND gates 210, 214 are enabled, then an output is received from the beam-switching tube 156 each time it is filled. Should the filling occur at a substantially rapid rate, neither the $p$ scaling-factor AND gate 210 or the $q$ scaling-factor AND gate 214 is energized, since the output received from the OR gate 218 is suitably rapid to avoid excessive time delays. This situation occurs when the number in the register which controls the bus selectors is one which, with the proper scaling-factor selection by the selector 200, provides an input pulse to the decade 156 on practically every possible transfer from the bus selectors 121 through 126 into the counter. These are numbers such as 5 through 9, 50 through 99, 500 through 999, etc. The $q$ AND gate 214 is energized when the number being transferred into the counters by the bus selectors is one which will not fill the decade 156 as rapidly as desired. These can be considered as middle-range numbers, such as 2 through 4, 20 through 49, or 200 through 499, etc. These are numbers which usually will require at least a third application of 10 pulses to the beam-switching distributor 106 before a pulse output is obtained from OR gate 218. Thus, the use of the $q$ scaling selector essentially tends to maintain the rate of the pulses derived at the output of OR gate 218 somewhat high.

For numbers such as 1, 10 through 19, 100 through 199, etc., which require at least six groups of ten pulses applied to the beam-switching tube 106, the $p$ scaling selector AND gate 216 is energized. This enables an output to be derived from the OR gate 218 at practically every other count. Thus, the rate of flow of output pulses from OR gate 218 is maintained high even when the number which energizes the bus selectors, together with the best use of the scaling-factor selector 200, causes a slow entry of pulses to the decade 156. It will be understood, of course, that the scaling selector 212 is identically set for all control-pulse-generating operations within a system, such as the one shown in Figure 1.

Figure 4:
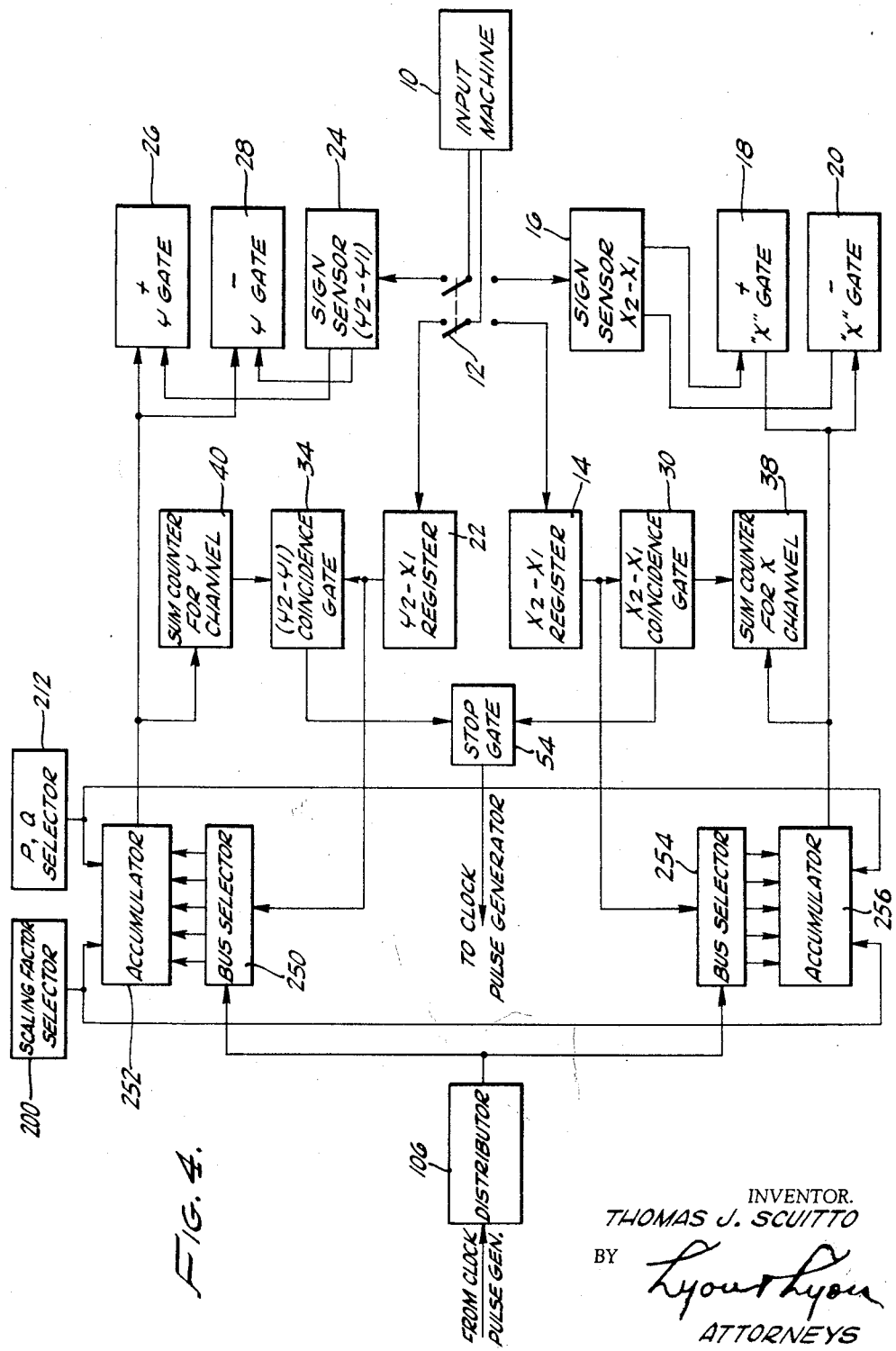
Figure 4 is a block diagram of a straight-line control-pulse generator which is modified in accordance with this invention.

Figure 4 is a block diagram showing the modification required of the straight-line control pulse generator shown in Figure 1 when the embodiment of the invention is inserted therein. Apparatus in Figure 4 having the same function as that shown in Figure 1 will be given the same reference numerals. Accordingly, the input from the input machine 10 into the register 14, the register 22, and the respective sign sensers 16 and 24, will be the same as was described previously. The functioning of the $y_2-y_1$ coincidence gate 34 in sensing the coincidence of the sum counter 40 count with the number in the $y_2-y_1$ register remains as previously described. Similarly, the function of the $x_2-x_1$ coincidence gate 30 sensing the count coincidence of the amount in the sum counter for the $x$ channel 38 with the $x_2-x_1$ register 14 is also the same as was previously described. Both coincidence gate outputs are applied to the stop gate 54 to stop the clock-pulse generator at the proper time.

The changes in the control-pulse generator effectuated by this invention include the use of a distributor 106, which is identical to the one shown in Figure 2. Its four-bus-line output is applied to bus selectors 250 for the $y$ co-ordinate and bus selectors 254 for the $x$ co-ordinate.

These bus selectors include apparatus similar to that shown in Figures 2 and 3. The instruction input to bus selector 250 is derived from the $y_2-y_1$ register 22. The instruction inputs to the bus selectors 254 are derived from the output of the $x_2-x_1$ register 14. It will be appreciated that the respective registers may comprise either electronic circuitry such as the well-known decade counters or decade tubes of the type described as beam-switching tubes, or relay registers. In any event, as shown in Figure 3, the number in each digit position is used to instruct each bus selector to provide a number of pulses equal to the number in the digit position under consideration.

The bus selector outputs are inserted into the accumulators 252, 256. Each accumulator includes the structure comprising the six beam-switching tubes 151 through 156 shown in Figure 2 and the associated logic. The output of each accumulator will be applied to the respective sum counters 38 and 40 and also to the respective plus and minus $x$ gates and plus and minus $y$ gates. The scaling-factor selection is established by the scaling-factor selector 200 and also the $pq$ scaling selector 212. The scaling factors selected must be identical for both accumulators. As previously pointed out, since the size of the largest number in the registers is known, being calculated by the input machine 10, the information for manually establishing the scaling factor 200 and the $pq$ scaling-factor selector 212 is available.

It should be noted that in Figure 1 the count required of the $$\frac{f}{\Delta x}$$

divide counter was established by the $x_2-x_1$ register, and the count required of the $$\frac{f}{\Delta y}$$

divide counter was established by the $y_2-y_1$ register. Divide counter $$\frac{f}{\Delta x}$$

output provided pulses for the control of the motion along the $y$ co-ordinate, and divide counter $$\frac{f}{\Delta y}$$

output provided pulses for the control of motion along the $x$ co-ordinate. In Figure 4, the accumulator output which is employed for the $y$ co-ordinate motion-control pulses receives control information from the $y_2-y_1$ register, and the control pulses employed for the purpose of controlling motion along the $x$ co-ordinate are derived from an accumulator 256 receiving control information from the $x_2-x_1$ register.

The system shown can also be extended for generating control pulses for more than two co-ordinate axes. This arrangement is described in the previously mentioned application by Rosenberg et al. for an Automation System. In the three-dimensional arrangement, again, each divide counter is replaced by the accumulator and its associated structure.

There is also described and claimed in the Rosenberg et al. application structure for generating pulse trains for controlling motion along a circular path. It is shown therein how at any instant of time the ratio between the frequencies of pulse trains emerging from the dividing counter is inversely equal to their division rates. If, instead of repeatedly dividing by the same quantity, as is done in the straight-line generator, the quantity by which each dividing counter divides pulses from the generator is varied in time in accordance with a proper function, pulse trains which can order a circle can be generated. With the modification provided by this invention, the quantity controlling the bus selectors may be varied in time in accordance with a proper function, in order to provide as an output from the accumulator pulse trains which can order a circle. Since it is known that the general equation for a circle with its center at point $a$, $b$, in a co-ordinate system is formula $$(x-a)^2+(y-b)^2=r^2$$

the instantaneous slope at any point on that circle is obtained by differentiating this equation, which produces $$\frac{dy}{dx} = -\frac{x-a}{y-b}$$

Making available to the bus selector the quantities $x-a$ and $y-b$, the outputs from the accumulators will be control-pulse trains which can be employed to generate the curve.

Figure 5 is a block diagram of a digital-function generator for generating control-pulse trains which can order a circle. Effectively, Figure 5 basically is Figure 7 of the previously noted application to Rosenberg et al., which is modified in accordance with this invention. For the purpose of generating pulse trains which can control the motion along two co-ordinates to provide a circular path, it is necessary to know the location of the center of the circle around whose periphery the circular path is laid out, the beginning of the circular path, and the end of the circular path. This information is provided on blueprints wherever it is necessary to cut such circular path. The co-ordinates for the center of the circle may be designated by $a$, $b$; the co-ordinates for the beginning of the circular path are represented by $x_1$, $y_1$; the co-ordinates for the end of the circular path are represented by $x_2$, $y_2$.

In the operation of the embodiment of the invention shown in Figure 5 herein, first the input machine 300 is employed to compute the value $x_1-a$. This is the projection of a radius of the circle connected between the beginning of the circular path and the center of the circle, on the $x$ axis. This quantity and its sign are entered into the value-and-sign register 302. This value-and-sign register may comprise a beam-switching tube counter of the type previously described. The sign representation is readily established as one or the other of the stable states of a flip-flop circuit having two stable states. Entry of the quantity and its sign is made from the register into the $x$-summing reversible counter 304 and into a sign senser 306. The reversible counter will have entered into it the value of the quantity. The sign senser 306 will have entered into it the sign of the quantity. After the transfer of the contents of the value-and-sign register 302 into the $x$-summing counter and sign senser, respectively 304 and 306, the connection between summing counter and register is opened. The quantity $x_2-a$ is calculated, both in sign and value, and this quantity is entered into the value-and-sign register 302. This quantity is not transferred into the summing counter and sign senser, but is retained in the register and is also established in the coincidence gate 308. This coincidence gate senses the value of the quantity in the $x$-summing counter 304, and the sign of that quantity in the sign senser 306 and the sign of the number in the $y$-summing counter in sign senser 316. When value and signs are identical with those entered from the value-and-sign register 302 and the sign entered from register 312, coincidence gate 308 will provide an output indicative of that fact to a second coincidence gate 310, and to a gate 350. The gate 350 is closed as a result, and prevents any further pulses from going to gates 320 and 322.

Next the quantity $y_1-b$, the projection on the $y$ axis of the radius connecting the beginning of the circle path and the circle center, is computed and is entered into the $y$ value-and-sign register 312. From thence it is transferred respectively in value and sign into a reversible $y$-summing counter 314 and into the sign senser 316. Thereafter, the connection between the $y$-summing counter and its register is opened, the quantity $y_2-b$, the projection on the $y$ axis of the radius connecting the end of the circle path and the circle center, is calculated, and this is entered from the value-and-sign register 312 into the coincidence gate 318. When coincidence gate 318 senses the contents of the sign senser 316, sign senser 306, and summing counter 314 and detects their equivalence to the value entered thereinto from the value-and-sign register 312 and sign register 302, it applies its output to the coincidence gate 310. Coincidence gate 310 then provides an inhibit output to turn off the pulse generator 301 and to an inhibit gate 352, thus preventing any more pulses being applied to gates 324 and 326.

Gates 320 and 322 will direct any input received to either the plus or the minus channel in the recording medium for the pulse train. Sign senser 316, by its output representative of the sign of the number, determines which of these two gates will be open. Sign senser 306 controls plus and minus gates 324 and 326. It should be noted that the sign senser for the $x$-summing counter controls the channels for the $y$ co-ordinate, and the sign senser for the $y$-summing counter controls the channels for the $x$ co-ordinate. It should also be noted that the output of each sign senser 306, 316, which controls the respective gates, is first connected to a double-pole, double-throw reversing switch, respectively 307, 317. The function of these switches is to make provision for the direction of the motion with which the curved path is being generated. If a clockwise curved-path motion is required, then both switches are thrown to position "$c$." If a counterclockwise generation of the circular path is required, then both switches are thrown to a position "$cc$." These switches serve to switch which one of the gates is opened and thereby the track in which a pulse is recorded. Since the mechanism controlled in response to these pulses will operate in one direction in response to pulses in the positive channel and in the opposite direction in response to pulses in the negative channel, the switches on the outputs of the sign sensers can control direction of motion.

As was described in the Rosenberg et al. application, these sign sensers can be flip-flop circuits which are set from one stable condition to the other to represent a plus or minus sign, and which are operated when the summing counter, the sign of the contents of which they represent, passes through the zero state. Thus, in passing from a positive count to a negative count, the number in the summing counter will decrease to zero and then increase again. Also, the converse is true; that is, in going from a negative to a positive count, the number in the summing counter will decrease to zero and then increase again.

In order to enable the summing counter to operate in the manner described, that is, increase in a manner 0-1-2-3-4 when passing from a positive count through zero into the negative region, instead of the usual reversible counter operation—that is, going from +1 to zero to 999 (assuming a three-decimal counter), a reversing gate 305 is provided for the $x$-summing counter and a similar reversing gate 315 is provided for the $y$-summing counter. These reversing gates operate to apply pulses with the proper polarity to the summing counters to be added to the count in the counter when it is positive and the pulses are received from the plus gate; to be added to the count in the counter when such count is negative and the pulse is received from the minus gate; to be subtracted from the count in the counter when the count is positive and the pulse is received from the minus gate; and to be subtracted from the count in the counter when the count is negative and the pulse is received from the plus gate.

As thus far described, the system is the same as the one described and shown in the previously mentioned Rosenberg et al. application. In accordance with this invention, pulses for the $x$-co-ordinate control are derived from an accumulator 330, which is identical to the one shown in Figure 2. The accumulator has entered thereinto pulses from a bus selector 332, which receives selection instructions from the $y$-summing counter 314. For controlling motion along the $y$ co-ordinate, pulses representative of the required motion increments are derived from an accumulator 334. This accumulator receives pulses from a bus selector 336, the instructions to which are received from the count in the $x$-summing counter 304. The scaling-factor selector 338 is used to scale the outputs of the accumulator, as is also the $pq$ scaling-factor selector 340. When the start source 303 is actuated, the pulse generator is enabled to apply pulses to the distributor 342. The output of the distributor is applied to the bus selectors 332, 336, which are enabled to select and transfer pulses into the respective accumulators 330, 334, in the manner previously described. Since the number contained in the respective $x$ and $y$ summing counters continuously changes, the previously indicated requirement for a curve, namely, that the control instructions to the bus selectors be varied in accordance with the requirements of the slope of the circular path, is fulfilled.

Another requirement for accurate circular interpolation requires that the $x$ accumulator 330 receive a single pulse to be added each time the $y$-summing counter 314 increases the absolute value of the number it contains, and symmetrically, the $y$ accumulator 334 receives a single pulse to be added each time the $x$-summing counter 304 increases the absolute value of the number it contains. Referring back to Figure 2B, there is shown an AND gate 159, which has one of its inputs connected to the bus which distributes the last count of the distributor 106. The other input to this AND gate 159 is the requisite signal just discussed. The output of AND gate 159 is applied to OR gate 160 to be added in the units decade. Thus, for every ten counts of the distributor 106, one count will be added by the accumulator, if AND gate 159 has its other input enabled at the time.

What is meant by an increase in the absolute value of the number in the sum counter is that if the number is positive, there is an increase in the positive value of the number. If the number is negative, there is an increase in the negative value of the number. Referring back to Figure 5, in order to determine whether or not an output from an accumulator is to be added or subtracted to the contents of a sum counter, it was previously described that the gates 305, 315 were controlled in a manner so that their outputs would either be added to or subtracted from the value in the associated $x$ and $y$ sum counters as determined by the signs of the values stored in both sum counters. In short, the absolute value in each of the sum counters is being increased when the output of the associated reversing gate is to be added to the value of the sum counter. Therefore, the add-output terminal of reversing gate 305 is connected to the reset input of a flip-flop circuit 354 and the add-output terminal of reversing gate 315 is connected to the set input of flip-flop 354. When flip-flop 354 is set, it applies its output to the AND gate 159 in the $x$ accumulator, and when reset it applies its output to the AND gate 159 in the $y$ accumulator. Since with a curve either the $x$ co-ordinate value increases when the $y$ co-ordinate value decreases, or vice versa, but never both together, flip-flop 354 is driven properly from the add outputs of the reversing gates.

After the value of $x_1-a$ has been entered into the sum counter 304 for the $x$ channel and $x_2-a$ is entered into the $x$ channel value-and-sign register 302, and after the value $y_1-a$ has been entered into the $y$-summing counter and the value $y_2-a$ has been entered into the value-and-sign register, it is then necessary to set the scaling-factor selectors 338, 340. These can be set by establishing the largest number which will be in one of the sum counters in the course of the circular-path control-pulse generation. This largest number may be readily observed on the blueprint from which the curve co-ordinate information is being taken, since it will be the point at which the value of either $x-a$ or $y-b$ is a maximum. Since $a$ and $b$ are constant, the two points along the curved path at which $x$ and $y$ have their maximum values are the two points from which the value can be computed. This value can then be employed in selecting the scale factors.

After the scale factor has been entered, the system shown in Figure 5 is ready for operation. The start source 303 is then energized, whereby the pulse generator can commence to apply pulses to the distributor 342. Bus selectors 332 and 336 enter the instructed number of pulses into the accumulators, which produce output pulses when the sums in the counters within the accumulators equal or are greater than integral multiples of the values established by the scale factors. The accumulator outputs are respectively applied to the plus and minus gates of the $x$ and $y$ channels. These gates are enabled in accordance with information derived from the sign sensers 306 and 316. The outputs from the enabled gates are the required pulse trains which may be recorded. The sign sensers respectively establish the sign of the count within counters 304 and 314. The sign sensers also control the respective reversing gates 305 and 315 in a manner so that the outputs from the plus and minus gates will be properly added or subtracted to the counts in the summing counters.

When the value in the $x$ and $y$ summing counters respectively attain $x_2-a$ and $y_2-b$ values, this is sensed by the respective coincidence gates 308, 318, which then provide an output to the coincidence gate 310, which stops the pulse generator. It should be noted that not only must the value in the summing counters coincide with the values in the registers, but also the sign information contained in the sign sensers 306 and 316 must be the same as the signs of the values in the register.

The improved straight-line and curve function generators operate more rapidly in that control pulses can be provided from substantially every 10 to 25 clock pulses. Heretofore, it was required to wait until the number of clock pulses equalled either the number in the register or the number in the sum counter.

The description thus far has been one wherein the values of the scaling-factor selector, as well as the $p$ and $q$ selectors, have been indicated as being performed manually, based upon the information available for the input to the system. Attention is now directed to Figure 6, wherein is shown an arrangement for enabling the automatic selection of the scaling factor, if desired. The structure employed will include the clock-pulse generator 400, which is regularly used, and a distributor 402 of the type previously described, which is driven by the flip-flop 404. The outputs of the distributor beam-switching tube, as detected on the first nine output targets, are distributed by bus lines to bus selectors 406, 408, which are associated with accumulators, respectively 410, 412. One of these bus selectors and accumulators may be employed for providing output pulses representative of increments of motion along one co-ordinate and the other accumulator may be similarly employed for providing output pulses representative of desired increments of motion along a second co-ordinate. If further co-ordinates are to be controlled, then it is within the scope of this invention to include further bus selectors and accumulators. The scaling-factor circuitry is represented by the rectangle labeled "scaling factor 414," actuation of which actuates one of the AND gates as described in Figure 2. The $pq$ scaling-factor actuator 416 is also employed for actuating the $pq$ scaling-factor AND gates as required. One set of scaling-factor actuators are employed for all the accumulators within the system. Various number values will be applied to the various bus selectors 406, 408.

At the outset, in the case of a straight line, one of these bus selectors will have a control value applied to it, which is greater than the others. For best operation, a scale factor is to be established for the system wherein, at most, one pulse output to a summing counter is obtained with each ten clock-pulse inputs to the distributor 402. This is the motivating concept of the automatic scale-factor selector.

The output of the clock-pulse generator 400 is applied simultaneously to two AND gates 420, 422. A second required input to AND gate 420 is the reset output of a flip-flop 424. Flip-flop 424 is reset in response to an output from AND gate 422. The output from AND gate 420 is applied to an amplifier 426, the output of which is applied to, amongst other structures, the flip-flop 404, which drives the beam-switching tube distributor 402. When it is desired to scale, a switch 428 is closed momentarily to cause a flip-flop 430 to be set. The output of this flip-flop is applied to a cathode follower 432. The output of cathode follower 432 is applied to and AND gate 434 and a second AND gate 436. AND gate 436 receives a second required enabling input from the output of the amplifier 426 and a third enabling input from the distributor 402 when it reaches its carry, or nine, count.

AND gate 436 applies its output to set flip-flop 424 and also to AND gate 434, whereby this AND gate is enabled to apply its output to accumulator counter zero reset circuitry 438. This reset circuitry is merely an arrangement for resetting to zero all the beam-switching tubes in all the accumulators in the system. The reset circuitry is shown in the tube manufacturer's literature. Alternatively expressed, all the beam-switching tubes in the accumulators are set back to their zero counts. The next clock pulse from the clock-pulse generator, after reset has occurred, is applied to the AND gate 422, which in view of the input thereto from the accumulator counter zero reset 438 is enabled to reset flip-flop 424. When flip-flop 424 is reset, its output again enables AND gate 420, whereby clock pulses may be derived from the output of amplifier 426. These clock pulses are again applied to the distributor 402. The distributor output is applied to the various bus selectors, whose outputs are entered into the accumulators. This operation is in accordance with the operation previously described in Figure 2.

The output of the cathode follower 432, when flip-flop 430 is set, is applied to a one-shot multivibrator 440. This one-shot drives a flip-flop 442 to its set condition. The output of the one-shot is also applied to a beam-switching tube 444 to reset it to its one count condition, to set a p-scale-factor flip-flop 446, and to reset a q-scale-factor flip-flop 448 through an OR gate 450.

Beam-switching tube 444 serves the function of providing scaling storage. When it is set to its one output condition, an output is applied to an AND gate 452. The second enabling input to this AND gate 452 is obtained from another AND gate 454. This AND gate requires, in order to provide an output, the input from the set output of flip-flop 442 and the input from cathode follower 432. Since both of these are present, the output from AND gate 452 will be obtained and is applied to a cathode follower 456. The output of this cathode follower is applied to four OR gates, respectively designated as 457, 458, 459, and 460. The output of these four OR gates are the scaling inputs to the second, third, fourth, and fifth scaling-factor AND gates which in Figure 2 are respectively designated as AND gates 202 through 205.

The remaining outputs of the beam-switching tube used for scaling storage which are employed in the circuit are the 2, 3, 4, 5, and 6 outputs. Outputs 1, 2, 3, and 4 are connected to two sets of AND gates. For output 1, these two AND gates are 452, 453; for output 2, these AND gates are 462, 467; for output 3, these AND gates are 466, 465; and for output 4, these AND gates are 464 and 463. The AND gate to which the fifth output is connected bears reference numeral 468. The sixth output is derived without an AND gate being required.

AND gate 452 applies its output through the cathode follower 456 to all the OR gates 457 through 460. Therefore, when the switching tube has its one count condition excited, scaling inputs to AND gates 202 through 205 are enabled. When AND gate 462 has applied thereto an output from the beam-switching tube in its second count condition, then a cathode follower 472 applies an output to OR gates 458, 459, and 460, whereby scaling-factor AND gates 203, 204, and 205 are enabled. When the third count condition of the beam-switching tube 444 is obtained, then cathode follower 473 is excited from AND gate 466. This, in turn, applies an output to OR gates 459 and 460, resulting in AND gates 204 and 205 of the scaling-factor selector being enabled. When AND gate 464 receives an output from the beam-switching tube 444 in its fourth count condition, this output is applied to the OR gate 460, which in turn enables AND gate 205 in Figure 2. From the above it should be seen that the count condition in the beam-switching tube at this time in the operation of the system enables the scaling-factor AND gates higher in order than the one associated with this count condition.

It was indicated previously that $p$ and $q$ flip-flops 446 and 448 are respectively set and reset when one-shot multivibrator 440 is driven. This enables the set output of flip-flop 446 to be applied to AND gate 447. When flip-flop 448 is set, its output is applied to AND gate 449. A second required input to both of these AND gates is provided by the output of flip-flop 442 when in its reset condition, which does not occur until the proper scaling factor has been obtained.

Effectively, the situation at the outset when the scaling factors are sought, is that pulses are allowed to be applied to the beam-switching tube 156 in Figure 2 simultaneously with their entry into any one of the decades 152 through 155. In the first phase of scaling, every pulse applied to decade tube 156 will be supplied to the output through an AND gate 190 (Figure 2A). When flip-flop 442 is reset at the end of the first phase, gate 190 will be inhibited, and only carry pulses derived from decade 156 will be available.

With the scaling factors set as described, if either of the numbers presented to the bus selectors 406 and 408 exceeds nine (000,009), an output from the corresponding accumulator, 410 or 412, occurs through an OR gate in the accumulator (gate 192 in Figure 2A) within the first nine clock pulses applied to the distributor 402. This output is applied to an OR gate 480. The output of this OR gate is applied to reset a flip-flop 482. The reset output of this flip-flop is applied through a delay circuit 484 to an AND gate 486. A second required input to this AND gate is a clock pulse from the amplifier 426. A third required input is the output of the cathode follower 432 in response to the scaling flip-flop 430 being in its set condition. The last required input to the AND gate 486 is the output of the distributor 402 when it attains its ninth count condition. At this time, the output of the AND gate 486 is enabled and is applied to another AND gate 488.

AND gate 488 has previously been primed by the output of flip-flop 442 in its set condition. The output of AND gate 488 is applied to the driver flip-flop 490 for the beam-switching tube 444 and drives it to its second count condition. The output of AND gate 486 is also applied to two AND gates 492, 494. AND gate 492 will be enabled when it receives as a second required input the output of flip-flop 442 when in its reset condition. The output of AND gate 492, when flip-flop 442 is reset and a pulse is available from gate 486, will reset the $p$ flip-flop and set the $q$ flip-flop, making the $q$ scaling input available. However, it will be noted that the output of the $p$ flip-flop, when in its reset condition, enables AND gate 494, which in addition has its other required two inputs, which are the same as the inputs to AND gate 492, present. In this case, AND gate 494 can then reset the $q$ flip-flop 448. Thus, the $q$ scaling input will be removed.

If none of the numbers presented to the bus selectors 406, 408 exceeded nine, there would be no output from OR gate 480, and the scaling-beam-switch tube would not have advanced to its second count condition; the $p$-$q$ action also would differ, as explained later.

The result of the beam-switching tube having been transferred to its second count condition enables an input into the decade 156 (shown in Figure 2A) if the number presented to either bus selector exceeds 99 during the next ten distributor pulses, when a sequence of operations similar to that just described is performed with a new trial scaling factor. The accumulators are reset to zero after each ten pulses from the distributor 402. The nine output of the distributor is applied to AND gate 436, which also has as its other two required inputs the output of the cathode follower 432 and the clock pulse from amplifier 426.

The output of the AND gate 436 is applied to set flip-flop 424. The output of AND gate 436 is also applied through AND gate 434 to actuate the accumulator zero-reset circuits 438, which resets the accumulators to this zero state. When the "accumulator-counter zero-reset" circuits have reset the accumulators, an enabling output is applied to AND gate 422, and when the next clock pulse arrives, the output of this AND gate resets flip-flop 424, whereby clock pulses may again be applied to the distributor 402. It should also be noted that the nine output of the distributor 402 was also applied to an AND gate 496, which has as its other required input a clock pulse, which upon its arrival enables the output of the AND gate 496 to set flip-flop 482.

Upon the occurrence of an output pulse within the next nine pulses counted by the distributor, the same sequence of operations will occur, as was described previously. This time, the beam-switching tube will be transferred to its third count condition, which increases the scaling factor by ten. This sequence can occur until the beam-switching tube scaling storage reaches its sixth count, which would mean that at least one of the numbers presented to the bus selectors is 100,000 or greater.

In the event that, upon testing one of the successive trial scaling factors, no output is received from OR gate 480, the flip-flop 482 will remain in its set condition. The output thereof is applied to an AND gate 504, which has as two other of its inputs the output of the cathode follower 432 and the clock-pulse input; the last required input in order to enable this AND gate to provide an output is the carry, or nine, output from distributor 402. The output of AND gate 504 operates to reset flip-flop 442, and thus both AND gate 454 and AND gate 488 are no longer enabled. This completes the establishing of the proper count in the beam-switch tube scaling storage and starts the determination of the proper states for the $p$ and $q$ scaling factors.

It should be noted that when flip-flop 442 is reset, cathode follower 508 provides an enabling input to AND gates 453, 467, 465, 463, and 468. AND gate 500 does not provide an output when flip-flop 442 is reset at this time, since the output from AND gate 504 is removed before the reset operation is completed. Thus, flip-flop 430 remains set and application of number-representative pulses to the accumulators can continue in the manner described previously. An enabling output is applied to AND gates 453, 467, 465, 463, 468 through cathode follower 508, so that the scaling factor previously selected will be operative during the selection of the $p$ or $q$ scaling factor.

It was previously indicated that output from each accumulator (see Figure 2A) is derived at first through an AND gate 190, the output of which is applied to an OR gate 192. Further, that gate 190 is enabled by flip-flop 442 in its set condition. After flip-flop 442 is reset, output from the accumulator will be obtained from the output of beam-switching tube 156, instead of from the input thereto.

It was also pointed out previously that the output of one-shot multivibrator 440 had left flip-flops 446 and 448 respectively in the set and reset states. Now, the distributor 402, accumulators 410, 412, and the flip-flop 482 and its attendant logical circuitry continue to operate in the manner previously described, except that since AND gate 488 is closed, beam-switching tube 444 is not advanced.

If the most-significant digit in the larger of the numbers applied to bus selectors 406 or 408 is unity, there is no output pulse from OR gate 480 before the occurrence of the next ninth count by the distributor 402 and flip-flop 482 remains set; then AND gate 504 is enabled and, through AND gate 444 and AND gate 502, can reset flip-flop 430. This terminates the $pq$ scaling procedure, leaving AND gate 447 enabled, and thus holding open the $p$ gate 210.

If the most-significant digit in the larger of the numbers applied to bus selector 406 or 408 is greater than one, there is at least one output pulse from OR gate 480 before the occurrence of the next ninth count by the distributor 402, and flip-flop 482 will have been reset; then the output of AND gate 486 upon that ninth count being attained is applied to AND gates 492 and 494. AND gate 492 has as a second required input the reset output of flip-flop 442. Thus, AND gate 492 can apply its output to reset flip-flop 446 and set flip-flop 448. These actions enable AND gate 449 and the $q$ gate 214, while closing AND gate 447 and the $p$ gate 210.

If the most-significant digit in the larger of the numbers applied to bus selector 406 or 408 is greater than four, there is at least one output pulse from OR gate 480 before the occurrence of the next ninth count of distributor 402, which leads to an output from AND gate 486. Through AND gate 494 and OR gate 450, this output pulse will serve to reset flip-flop 448. Simultaneously, through AND gate 492, it tends to set the flip-flop too, but the reset effect prevails because it is a change from the previous state of one flip-flop. This prevents the $q$ gate from being operative, and thus output from beam-switching tube 156 is only obtained when it is filled.

After the appropriate scaling factors have been selected, by the process explained above, there will be a round of distributor action that does not cause any output from OR gate 480, and so does not reset flip-flop 482 before the next nine count of distributor 402. Then, upon the occurrence of that next nine count, AND gate 504 will be enabled, and will pass the next clock pulse (coming from amplifier 426); the output of AND gate 504 will pass through AND gates 444 and 502 (both previously enabled) and reset flip-flop 430. As a result, amplifier 432 no longer enables AND gate 436. Just before being disabled, AND gate 436 passes a pulse, as previously explained, that sets flip-flop 424 for the last time and that (through AND gate 434) actuated the accumulator-counter zero-reset circuitry 438 for the last time, but when flip-flop 424 is reset (at the next clock pulse) it remains reset indefinitely. This ends the scale-factor selection process and allows the normal function of computing to proceed.

From the description that has preceded, it will be seen that the automatic-scale-factor selection equipment shown in Figure 6 will function to find the scale factor which does not produce an output to the sum counter within the first ten pulses which are applied to the distributor. Having found the proper scale factor, flip-flop 430 is reset and the system can then proceed to function in the manner described for Figure 4 to generate control-pulse trains for directing a straight-line path, and in the manner described for Figure 5, to generate control pulse trains to direct a circular path. Since the straight-line and circle generator use substantially the same apparatus but with different interconnections, switching arrangements are provided so that the same apparatus may perform all these functions.

In the case of the circle generator, if it is desired to find the highest number for the establishment of the scale factor automatically, then a "dry run" may be employed for this purpose. Since the value of the highest number need only be known approximately in order to establish a scale factor, by injecting the pulses in the tens or hundreds decades of the sum counters in the circle generator, instead of into the units decade, the counters will count by tens or hundreds, instead of by units. Thus, the dry run is effectuated much more rapidly than when the units count is employed. The largest count attained during the dry run may be observed on an indicator for the counter or a recording made, and the highest value attained by the counter may be observed from the recording. This value may then be inserted into the automatic-scaling-factor selection system for obtaining the proper scaling factor for the circle.

In addition to being employed for the purpose of generating control-pulse trains which may be employed for controlling desired motion paths, the structure shown in Figure 2 also represents a block diagram of a decimal adder and/or multiplier. The type of addition employed is parallel addition, and any desired quantity may be added by successively energizing the inputs to the bus selectors in accordance with the values of these quantities. The decades 151 through 156 will produce a representation of the sum. For the purpose of multiplication, the multiplicand is employed to excite the input to the bus selector, and the multiplier is employed to control the number of sets of ten pulses which are emanated from the clock-pulse source 100. Thus, if it were desired to multiply 562 by 35, the input to the bus selectors would be 562, the clock-pulse source would then be energized to provide 350 output pulses, or 35 sets of ten.

While the description of the embodiment of the invention has been made using beam-switching tubes as decade counters, it is to be understood that this is not to be construed as a limitation upon the invention, since other counters may be employed in place of the beam-switching tubes without departing from the spirit thereof. Neither is the fact that only a straight-line and circle function generator have been described in detail to be construed as a limitation on the use of this invention for the generation of control-pulse trains for other curves, since the structure and prinicples described are applicable for other curves and for systems using more than two co-ordinate axes.

There has accordingly been described herein a novel, useful, and improved arrangement in function-generating equipment for generating control pulses for controlling a desired type of path. The arrangement is improved in that it enables a much more rapid operation of the system than heretofore. The arrangement is novel and useful, not only for the purpose of generating control-pulse trains, but also for providing rapid decimal additions and/or multiplications.

I claim:

1. In a digital function generator of the type wherein there are derived from a source of pulses separate control-pulse trains representative of the motion required along separate co-ordinates to obtain a desired resultant path, each pulse in a train representing an increment of motion along a co-ordinate axis, and there is included a means for establishing a number for each co-ordinate equal to the differential of the equation of said path for said co-ordinate, the improvement in the apparatus for deriving said pulse trains comprising means for deriving successive groups of pulses from said pulse source, a counter for each co-ordinate, means for entering into each counter from each group of pulses derived by said means for deriving successive groups of pulses, a number of pulses equal to the differential of the equation of said path with respect to a co-ordinate, means for establishing a scale-factor value, and means for deriving a control pulse from said counter whenever the value in said counter equals or exceeds a multiple of said scale-factor value.

2. In a digital function generator of the type wherein there are derived from a source of pulses separate control-pulse trains representative of the motion required along separate co-ordinates to obtain a desired resultant path, each pulse representing an increment of motion along a co-ordinate, the improvement in the apparatus for deriving said pulse trains from said source of pulses comprising for each co-ordinate axes means to establish a value equal to the differential of the equation of said path with respect to a co-ordinate, means for successively establishing groups of pulses from said pulse source, means responsive to the value established for selecting from each of said groups of pulses a number of pulses for each digit position of said value equal to the number in said digit position, a counter including a decade for each digit position, means for entering said selected numbers of pulses into the respective decades associated with the digit positions to establish said value in said counter, means for establishing a scale factor value, and means for deriving a control pulse from said counter whenever the value in said counter equals or exceeds a multiple of said scale-factor value.

3. In a function generator of the type wherein there are derived from a source of pulses separate control-pulse trains representative of the motion required along separate co-ordinate axes to describe, as a resultant of all said co-ordinate motions, a desired path, the improvement comprising a single decade-counter stage to which pulses from the source are applied to be counted, said counter stage providing an output pulse for each of its count states, a plurality of bus lines, means for coupling said bus lines to said single counter stage to apply a different number of said output pulses to each of said bus lines during a count cycle; for each of said co-ordinate axes means for establishing a number equal to the differential of the equation of said desired path with respect to a co-ordinate, a plurality of bus-line-selecting means, each of which is assigned to a different digit position in a number, each of said bus-line-selecting means including a separate input terminal associated with each value in a digit position, a single output terminal, and means responsive to a signal being applied to an input terminal to apply to said output terminal from said bus lines a number of pulses equal to the value associated with the excited input terminal, means for exciting the input terminals of said bus line selecting means from said means for establishing a number, a counter having a plurality of decade stages each of which is associated with a different digit position, means for coupling the output terminal of each bus-line-selecting means to the input to the decade stage associated with the same digit position to establish said number in said counter, means for selectively applying the input applied to one of the lower-order decades to the highest-order decade in said counter, and means for selectively deriving output pulses from said highest-order decade when it attains desired counts.

4. In a function generator as recited in claim 3 wherein said desired path is a straight line, each said means for establishing a number for one co-ordinate is a register wherein is entered the value of the projection of said desired straight-line path on said co-ordinate axis, and the output pulses of a highest-order decade comprise the control-pulse train for motion along the co-ordinate axis the projection value on which was used to excite the bus selectors providing pulses to the counter including said highest-order decade.

5. In a function generator as recited in claim 3 wherein said desired path is circular, each said means for establishing a number for one co-ordinate is a reversible counter wherein there is entered the value of the projection on the co-ordinate axis of the radius extending between the center of the circular path and the beginning of the circular path, the output pulses of a highest-order decade comprise the control-pulse train for motion along the co-ordinate axis other than the one the projection value on which was used to excite the bus selectors providing pulses to the counter including said highest-order decade, and there are included means for entering said output pulses to be counted into a reversible counter associated with the same co-ordinate as the one along which said output pulses represent motion.

6. An improved system for deriving from a source of pulses separate control-pulse trains representative of the motion required along separate co-ordinate axes to describe as a resultant motion a desired straight-line path, said system comprising a first and second register respectively associated with a first and second one of said co-ordinate axes, means to enter into said first register the value of the projection of said path on said first axis, means to enter into said second register the value of the projection of said path on said second axis, a single decade-counter stage providing an output pulse for each count state, means for applying pulses from said source to said single decade counter to be counted, a plurality of bus lines, means for respectively applying to each of said bus lines different numbers of count-state outputs from said counter to provide different numbers of pulses on each of said bus lines during a counting cycle, first and second sets of bus selectors, said first and second sets respectively having a bus selector associated with each digit position in said respective first and second registers, each said bus selector having means responsive to the value of a digit signal applied to its input to derive during a count cycle from said bus lines an equal number of pulses, means to respectively excite said first and second bus selector sets responsive to digit signals from said first and second registers, a first and second counter each including a decade associated with each digit position in said respective first and second register, means to respectively enter first and second bus selector set outputs into said first and second counter decades with correspondence in digit position association being maintained between decades and bus selectors, means for establishing a scale factor value for said first and second counters whereby an output pulse is derived from each of said first and second counters, a first and second sum counter, means for entering for counting the first counter output pulses into said first sum counter, means for entering for counting the second counter output pulses into said second sum counter, means for detecting when the count in said first and second sum counters are respectively identical with the values in said first and second registers and emitting an output indicative thereof, and means responsive to the output from said means for detecting and terminating the application of pulses from said source to said single decade counter by said means for applying whereby the outputs from said first and second decade counters respectively comprise control-pulse trains for representing motion along said first and second co-ordinate axis.

7. An improved system for deriving from a source of pulses separate control-pulse trains representative of the motion required along separate co-ordinate axes to describe as a resultant motion a desired circular path, said system comprising a first and second sign and value register respectively associated with a first and second one of said co-ordinate axes, a first and second reversible counter respectively associated with said first and second sign and value registers, a first and second sign-sensing means for respectively sensing the sign of values in said first and second registers and producing an output indicative thereof, means for respectively entering into said first and second reversible counters and said first and second sign-sensing means the value and sign of the projection of the radius connected to the beginning of said circular path on each of said first and second co-ordinate axes, means for respectively entering into said first and second sign and value registers the value and sign of the projection of the radius connected to the end of said circular path on each of said first and second co-ordinate axes, a single decade-counter stage providing an output pulse for each count state, means for applying pulses from said source to said single decade stage to be counted, a plurality of bus lines, means for respectively applying to each of said bus lines different count-state outputs from said counter to provide different numbers of pulses on each of said bus lines during a counting cycle, first and second sets of bus selectors, said first and second sets respectively having a bus selector associated with a digit position in said respective first and second reversible counters, each said bus selectors having means responsive to the value of a digit signal applied to its input to derive during a count cycle from said bus lines an equal number of pulses, means to respectively excite said first and second bus selector sets from said second and first reversible counters, a first and second decimal counter each including a decade associated with each digit position in said respective first and second registers, means to respectively enter said first and second bus selector set outputs into said first and second decimal-counter decades with correspondence in digit position association being maintained between decades and bus selectors, means for establishing a scale-factor value for said first and second counters whereby an output pulse is derived from each of said first and second decimal counters, means under control of said second sign-sensing means output to enter the output pulse from said first decimal counter into said first reversible counter, means under control of said first sign-sensing means output to enter the output pulse from said second decimal counter into said second reversible counter, means for sensing when the values and signs in the respective first and second registers equal the values and signs in the first and second sign-sensing means and first and second reversible counters, and means responsive to operation of said means for sensing to terminate further application of pulses from said pulse source to said single decade counter whereby the outputs from said first and second decade counters respectively provide control pulse trains for representing motion along said first and second co-ordinate axes.

References Cited in the file of this patent

UNITED STATES PATENTS

| | | |
|---|---|---|
| 2,398,771 | Compton | Apr. 23, 1946 |
| 2,442,428 | Mumma | June 1, 1948 |
| 2,528,394 | Sharpless et al. | Oct. 31, 1950 |
| 2,639,378 | Moerman | May 19, 1953 |
| 2,700,503 | Crosman | Jan. 25, 1955 |
| 2,833,941 | Rosenberg et al. | May 6, 1958 |